United States Patent [19]

Knorr et al.

[11] Patent Number: 5,977,214
[45] Date of Patent: Nov. 2, 1999

[54] PROCESS FOR PRODUCING DUROPLASTIC MOLDING COMPOUNDS

[75] Inventors: Herbert Knorr, Essen; Peter Adolphs, Menden; Werner Nolte, Duisburg; Bernd Rau, Hemer; Bernhard Muller, Menden; Michael Hermann, Schwerte, all of Germany

[73] Assignee: Bakelite AG, Germany

[21] Appl. No.: 08/930,637

[22] PCT Filed: Feb. 27, 1997

[86] PCT No.: PCT/EP97/00964

§ 371 Date: Jan. 20, 1998

§ 102(e) Date: Jan. 20, 1998

[87] PCT Pub. No.: WO97/32921

PCT Pub. Date: Sep. 12, 1997

[30] Foreign Application Priority Data

Mar. 5, 1996 [DE] Germany ............ 196 08 389

[51] Int. Cl.$^6$ ................ C08J 3/22; C08J 3/24; C08L 61/06
[52] U.S. Cl. ............ 523/351; 523/440; 524/541; 528/503
[58] Field of Search .............. 523/351, 145, 523/346, 440; 524/508, 541

[56] References Cited

U.S. PATENT DOCUMENTS

| | | | |
|---|---|---|---|
| 4,845,162 | 7/1989 | Schmitt et al. | 525/423 |
| 4,918,116 | 4/1990 | Gardziella et al. | 524/541 |
| 5,458,478 | 10/1995 | Stibal et al. | 523/351 |

FOREIGN PATENT DOCUMENTS

| | | |
|---|---|---|
| 699008 | 12/1964 | Canada . |
| 0309410 | 3/1989 | European Pat. Off. . |
| 4101048 | 7/1992 | Germany . |
| 0010476 | 1/1980 | Japan . |
| 786898 | 3/1955 | United Kingdom . |

OTHER PUBLICATIONS

Patent Abstract of Japan, vol. 096,No. 006 Jun. 1996 & JP 08 034858 A Shin Etsu Chem. Co., Ltd. Feb. 1996 (1 pg).

Patent Abstracts of Japan, No. 63161018, Jul. 4, 1988 & No. 61307721, Dec. 25, 1986, Nagase Rihei, (1 page).

*Primary Examiner*—Tae Yoon
*Attorney, Agent, or Firm*—Bakelite AG

[57] ABSTRACT

In the process according to the invention molding compounds based on duroplastic bonding agents are produced thereby that the bonding agents are mixed as a melt with the filler and additive substances. Curing is achieved thereby that the temperature of the mixture during the mixing process increases above the onset temperature of the curing reaction and, after the desired degree of curing has been attained, is suddenly lowered.

9 Claims, No Drawings

PROCESS FOR PRODUCING DUROPLASTIC MOLDING COMPOUNDS

The invention relates to a process for producing molding compounds which comprise as the bonding agent resins or mixtures of resin and curing agent, which cure above an onset temperature above their melting points. The most important such bonding agent is a mixture of novolak and hexamethylene tetramine.

For corresponding phenolic resin molding compounds currently three production processes exist which differ in principle (cf. Kunststoff-Handbuch, Vol. 10, Duroplaste, 2nd Edition, Hanser Verlag 1988, pp. 211–213): the liquid-resin process in which the fillers are impregnated with resin solution and the moist substances obtained in this way are dried and further condensed to the desired degree of condensation. Working with corresponding moist substances is undesirable in operational practice since their clean handling is difficult and drying represents an additional high-energy operation.

In the turbomixer process the components of the molding compound are homogenized in high-speed mixers with short mixing times. A high input of energy through the mixer results can only be poorly regulated and is distributed unevenly. Consequently, problems in reproducibility result. In particular, the degree of condensation of the precondensed substances is not uniform. Such problems are fewer in the so-called fused mass process. Here premixtures are produced from ground solid resin, curing agent as well as filler and additive substances, which are subsequently further processed on rollers or in kneaders. Through the input of energy due to the friction the resin melts, impregnates the filler substances and is largely precondensed to the desired degree. The product produced in this way is cooled and the brittle substance obtained is ground. In the process, high dust components are generated and the curable molding compounds must additionally be screened and sorted to size.

It is therefore the task of the invention to avoid these disadvantages, i.e. to describe an economic process for producing duroplastic molding compounds in which, requiring few operational steps with minimum energy input, a uniformly condensed and readily reproducible product is obtained which is ground or granulated to a desired grain size without high dust fractions being generated.

Solving the task takes place through processes according to claims 1 to 10.

It was found that a very simple production process for molding compounds can comprise that the at least partially melted resin is added to a premixed mixture comprising filler substances and/or fibers, additive substances and, as far as necessary, added to the curing agent and thoroughly mixed with it. Good wetting and impregnation of the filler substances and fibers results as well as high homogeneous mixing. The introduced frictional energy is very low since the temperature increase of the mixture results essentially from the cooling of the resin melt. This is especially favorable if the melt resulting in the production of the resins is used directly.

But, surprisingly, in this process no pasting together and no brittle chunks are formed but rather a free-flowing, small-grain product is obtained which can be reduced to the desired grain size without significant dust formation. Thus, through this simple process several operational steps are saved. Since the mixing process is gentler than the previously described processes, in particular long fibers are less detrimentally affected, i.e. from the molding compounds produced according to the invention molded bodies can be produced with have improved resistance to impact and notched-bar strength.

In the simple embodiment of the present invention the mixing process is controlled such that the temperature in the mixing apparatus, i.e. accordingly also the temperature of the produced molding compound, remains below the onset temperature of the curing reaction.

Within prior art it is customary in the production of molding compounds, in particular such based on phenolic resins, to adjust the resins to a desired higher degree of curing in order to adapt the flow {behavior} of the materials to the corresponding processing machines. It was found that this is also possible in a simple manner in the process according to the invention if the process is carried out such that the temperature in the mixing apparatus, and thus the temperature of the produced molding compound, exceeds the onset temperature of the curing, and the mixing process takes place until the desired degree of curing is attained. The mixing process is stopped at this point and the obtained molding compound is cooled below the onset temperature as rapidly as possible. Here also is obtained a free-flowing granulate with uniform grain size and readily reproducible degree of curing.

The composition of the molding compounds produced according to the invention corresponds to conventional molding compounds based on duroplastic bonding agents, i.e. they comprise heat-curable bonding agents, conventional filler substances (such as for example chalk, clays, titanium dioxide, lithopone, silicon dioxide or heavy spar) and/or fibers (such as for example cellulose, wood, fiberglass fibers and potentially additive substances such as for example pigments, curing accelerators, stabilizers as well as gliding and parting agents). Bonding agents, on the one hand, are self-curing resins, resin mixtures or mixtures of resin and curing agent. It is therein important that the onset temperature for curing the bonding agents is above its melting point. Among appropriate types of resins are phenolic, urea and melamine resins as well as corresponding co-condensates but also unsaturated polyesters, polyamides, polydiallyl phthalates or epoxy resins. Preferred bonding agents are novolak resins and hexamethylene tetramine (hexa) as curing agent, wherein in the especially preferred case the novolak resin used is a mixture of novolaks of different chemical structure (novolak based on phenol and/or bisphenols) and/or different degree of condensation.

The resins, at least partially in the melted state, are added in a high-speed mixing apparatus to a premixture comprising filler and additive substances and mixed thoroughly. It is also possible to use a resin mixture comprising a melted resin and up to 40 percent by weight of nonmelted powder-form resin.

If the resin requires a curing agent, several options are available: either the curing agent is premixed with the filler substances and/or fibers and additive substances and are subsequently mixed as a component of the premixture with the liquid resin or the curing agent is melted with the resins, respectively dissolved in the resin melt, and this bonding agent melt is mixed with the premixture comprising filler substances and/or fibers and additive substances. However, it is preferred that first the filler substances and/or fibers as well as the additive substances are mixed, to this mixture the resin melt is added and mixed and, into the mixture prepared in this way, the curing agent is mixed in liquid or solid form.

With the exception of the possible premixing of the resins, the process according to the invention is carried out in a single mixing apparatus. Suitable are high-speed mixing apparatus in which the possibility is given of also controlling the temperature of the material to be mixed. Examples are high-speed intensive mixers with circumferential speeds $v_u > 5$ m/s, multipleshaft high-speed stirrers, turbo or high-power centrifugal mixers.

Mixing the solid components filler substances and/or fibers as well as the additive substances and potentially the curing agent takes place for 0.5 to 30 minutes. It must be controlled such that the temperature of the premixing stays within the desired limits. The mixing device must potentially be cooled.

The temperature limits of the premixing are a function of the desired way in which the process is to be carried out: if the molding compound is to be produced such that the components are only mixed with each other without curing the resin, the temperature of the premixing must remain below 70° C., preferably below 50° C., before the resin is added. If, in contrast, the resin in the molding compound is to be partially cured in the mixer to a desired degree of curing, the temperature of the premixture must remain below 100° C., preferably below 70° C., before the resin is added.

Without interrupting the mixing process, the resin or resin-curing agent melt is apportioned to the premixture. The resulting temperature of the mixture is essentially a result of the thermal energy of the melt. If no partial curing of the resin is desired, the temperature in the mixing apparatus must remain below the onset temperature of the curing reaction.

If, in contrast, the resin in the molding compound is to have a higher degree of curing than the introduced resin, the temperature in the mixing apparatus must exceed the onset temperature of the curing reaction. This can be achieved and controlled through the following measures: increasing the temperature of the premixture and/or of the resin melt, increasing the rotational speed of the mixing unit in the apparatus, extension of the mixing time, increasing the friction of the mixing. The latter can take place in simple manner by adding thixotropically acting means such as bentonite, highly dispersed silicic acid or carbon black. A simple way for increasing the friction of such a mixture comprises adding 4 percent by weight of water to the mixture. As soon as the onset temperature in the mixer is exceeded, the curing reaction takes place. It is directly measurable by the increased current consumption through the mixer. When reaching the current consumption corresponding to the desired degree of curing, the mixing process is stopped and the obtained molding compound is cooled as rapidly as possible below the onset temperature. This takes place in the simplest case thereby that the molding compound is quickly emptied into a tank.

EXAMPLES

Example 1

Into a mixing apparatus (capacity 300 l) with a centrifugal mixing unit with fixed number of rotation of 155 U/min ($V_u$=5.26 m s$^{-1}$) are placed
32.0 kg aluminum hydroxide
11.0 kg fiber glass
17.0 kg chalk
0.6 kg peroxide preparation
1.0 kg titanium dioxide
2.0 kg calcium stearate
0.1 kg color stock
0.3 kg gliding/parting agents
and thoroughly mixed for 30 s. The premixture is homogeneous and has a temperature of approximately 30° C. While maintaining the mixing temperature 16 kg of a polyester resin melt having a temperature of 130° C. (viscosity at 150° C.: 3.000 CP) are added over a period of 5 minutes.

Stirring takes place for 5 minutes at nonreduced mixer speed. The obtained substance has a temperature of 50° C. and is drained through the fold-out bottom of the mixer into a tank.

The inner wall of the mixer is clean and all mixing appliances are bright. The obtained molding compound is homogeneous and free-flowing with low dust formation. The individual particles have an average size of 1 to 2 mm.

Example 2

In a mixing apparatus (capacity 300 l) with a centrifugal mixer with variable rotational speed and a mixer with a tree-shaped stirrer with a fixed number of rotations of 3000 RPM a molding compound is produced according to the following process variant:
The following starting materials
15.5 kg wood meal
10.5 kg chalk
10.5 kg kaolin
2.0 kg magnesium oxide
0.5 kg carbon black
4.0 kg Hexa
0.1 kg wax
2.0 kg water
are placed into a mixer and mixed for 25 minutes at a rotational speed of 200 RPM. The premixture in this case has a temperature of approximately 60° C.

25 kg phenolic resin melt (160° C.) are added over 2 minutes while stirring the melt. The temperature increases above 100° C. and the curing reaction sets in. After approximately 5 minutes a rapid increase of the current consumption from approximately 11 A to 35 A occurs. The desired precuring has been attained.

The mixer is stopped and the molding compound is emptied all at once into a tank by opening the bottom flap of the mixer.

After cooling, the free-flowing product is granulated or ground to a uniform grain size and is subsequently screened. No significant dust development occurs. The non-utilizable fine-grain fraction is also negligibly small.

With the molding compound produced in this way, injection-molded and pressed pieces are produced in a manner known per se, which, according to visual inspection, are free of faults.

We claim:

1. A process for the preparation of a molding composition comprised of a) resin or resin plus curing agents, b) filler substances and/or fibers and c) optional additive substances consisting essentially of premixing in a high speed mixing apparatus, the filler substances and/or fibers and optional additive substances, adding to the premix the resin agent present at least partially in the form of a melt with thorough mixing to obtain a molding composition above the onset temperature of the curing reaction, stopping the mixing and rapidly cooling the composition when the desired degree of curing is reached to obtain the molding composition as a free-flowing small grain product, the curing agent which cures above an onset temperature above the melting point of the resin, if required, may be in the premix or added with the resin.

2. A process for the preparation of a molding composition comprised of a) resin bonding agents, b) filler substances and/or fibers and c) optional additive substances comprising premixing in a high speed mixing apparatus, the filler substances and/or fibers and optional additive substances, adding to the premixed resin bonding agent present at least partially in the form of a melt and curing agent which cures above an onset temperature above the melting point of the resin, with thorough mixing to obtain the molding composition above the onset temperature of the curing reaction, stopping the mixing and rapidly cooling the composition when the desired degree of curing is reached.

3. A process for the preparation of a molding composition comprised of a) novolak resin and hexamethylenetetramine bonding agents, b) filler substances and/or fibers and c) optional additive substances comprising premixing in a high speed mixing apparatus, the filler substances and/or fibers and optional additive substances adding to the premixed resin bonding agent present at least partially in the form of a melt with thorough mixing to obtain the molding composition above the onset temperature of the curing reaction, stopping the mixing and rapidly cooling the composition when the desired degree of curing is reached, a curing agent which cures above an onset temperature above the melting point of the resin, if required, may be in the premix or added with the resin.

4. Process as claimed in claim 1, characterized in that the temperature of the premixture before the resin melt is added is below 70° C.

5. Process as claimed in claim 1, characterized in that the temperature of the premixture before the resin melt is added is below 100° C.

6. Process as claimed in claim 3, characterized in that the novolak resin used is a mixture comprising novolaks of different chemical structure and/or different degree of condensation.

7. Process as claimed in claim 3, characterized in that increasing the temperature of the mixture above the onset temperature takes place through frictional heat.

8. Process as claimed in claim 7, characterized in that to the mixture is added water to increase the friction.

9. Process as claimed in claim 1, characterized in that the cooling of the molding compound takes place through rapid emptying into a tank.

* * * * *